United States Patent
Mancini et al.

(10) Patent No.: US 11,692,630 B2
(45) Date of Patent: Jul. 4, 2023

(54) REDUNDANT SEAL WITH RADIAL FEATURES

(71) Applicant: Ford Global Technologies, LLC, Dearborn, MI (US)

(72) Inventors: JonCarlo Mancini, Livonia, MI (US); Gary J. Haddix, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 16/854,353

(22) Filed: Apr. 21, 2020

(65) Prior Publication Data
US 2021/0324956 A1    Oct. 21, 2021

(51) Int. Cl.
*F16J 15/12*    (2006.01)
*F02M 55/00*    (2006.01)

(52) U.S. Cl.
CPC .......... *F16J 15/121* (2013.01); *F02M 55/004* (2013.01); *F02M 2200/16* (2013.01)

(58) Field of Classification Search
CPC ........ F16J 15/121; F16J 15/122; F16J 15/123; F02M 55/004; F02M 2200/16; F16L 21/03; F16L 17/025
See application file for complete search history.

(56) References Cited

U.S. PATENT DOCUMENTS

| | | | | |
|---|---|---|---|---|
| 2,841,429 A * | 7/1958 | McCuistion | ......... | F16J 15/3236 277/587 |
| 3,599,931 A * | 8/1971 | Hanson | ............... | F16K 31/1221 277/467 |
| 3,702,193 A * | 11/1972 | Flegel et al. | ............. | F16J 15/02 277/615 |
| 3,893,919 A * | 7/1975 | Flegel | ................. | E04D 13/0409 210/166 |
| 4,426,095 A * | 1/1984 | Buttner | ................. | F16L 41/088 277/606 |
| 5,165,834 A * | 11/1992 | Takenouchi | .......... | F16B 43/001 411/533 |
| 5,201,625 A * | 4/1993 | Takenouchi | ....... | H01R 13/6215 439/364 |
| 5,409,337 A * | 4/1995 | Muyskens | .............. | F16J 15/121 285/379 |
| 5,653,452 A * | 8/1997 | Jarvenkyla | .............. | F16L 47/08 285/345 |
| 6,398,223 B1 | 6/2002 | Radosav | | |
| 7,004,477 B2 | 2/2006 | Sakata et al. | | |
| 7,204,218 B2 | 4/2007 | vom Stein | | |
| 7,854,434 B2 | 12/2010 | Heiman et al. | | |
| 7,975,870 B2 | 7/2011 | Laule et al. | | |
| 8,083,237 B2 * | 12/2011 | Smith | ................... | F16L 21/002 277/648 |
| 8,262,140 B2 * | 9/2012 | Santi | ..................... | F16L 15/003 285/332.2 |
| 8,814,174 B2 * | 8/2014 | Okuda | .................... | F16L 23/22 277/651 |

(Continued)

*Primary Examiner* — Nicholas L Foster

(74) *Attorney, Agent, or Firm* — Vincent Mastrogiacomo; McCoy Russell LLP

(57) ABSTRACT

Methods and systems are provided for a sealing device. In one example, a seal comprises a plurality of radial features and a plurality of axial features extending from a cylindrical body, the cylindrical body comprises a first material and a second material, wherein the second material is stiffer than the first material.

20 Claims, 7 Drawing Sheets

(56) References Cited

U.S. PATENT DOCUMENTS

| | | | |
|---|---|---|---|
| 9,085,101 B2* | 7/2015 | Guzowski | F16L 21/03 |
| 9,234,612 B2* | 1/2016 | Santi | F16L 17/02 |
| 10,612,660 B2* | 4/2020 | Yanagi | F16J 15/125 |
| 10,788,150 B2* | 9/2020 | Parsley | F16L 27/1017 |
| 2008/0252020 A1* | 10/2008 | Heiman | F16J 15/121 |
| | | | 277/593 |
| 2010/0181727 A1* | 7/2010 | Santi | F16L 15/003 |
| | | | 285/332.2 |
| 2010/0225110 A1* | 9/2010 | Christie | F16J 15/123 |
| | | | 277/637 |
| 2011/0008101 A1* | 1/2011 | Santi | E21B 17/042 |
| | | | 403/288 |
| 2012/0049409 A1* | 3/2012 | Guzowski | B29C 45/1459 |
| | | | 264/279.1 |
| 2013/0106064 A1 | 5/2013 | Okuda et al. | |
| 2017/0089465 A1* | 3/2017 | Yanagi | F16J 15/125 |
| 2019/0032783 A1* | 1/2019 | Yanagi | F16J 15/12 |
| 2021/0172524 A1* | 6/2021 | Hagiwara | F16J 15/062 |
| 2022/0003342 A1* | 1/2022 | Bichler | F16L 21/03 |

\* cited by examiner

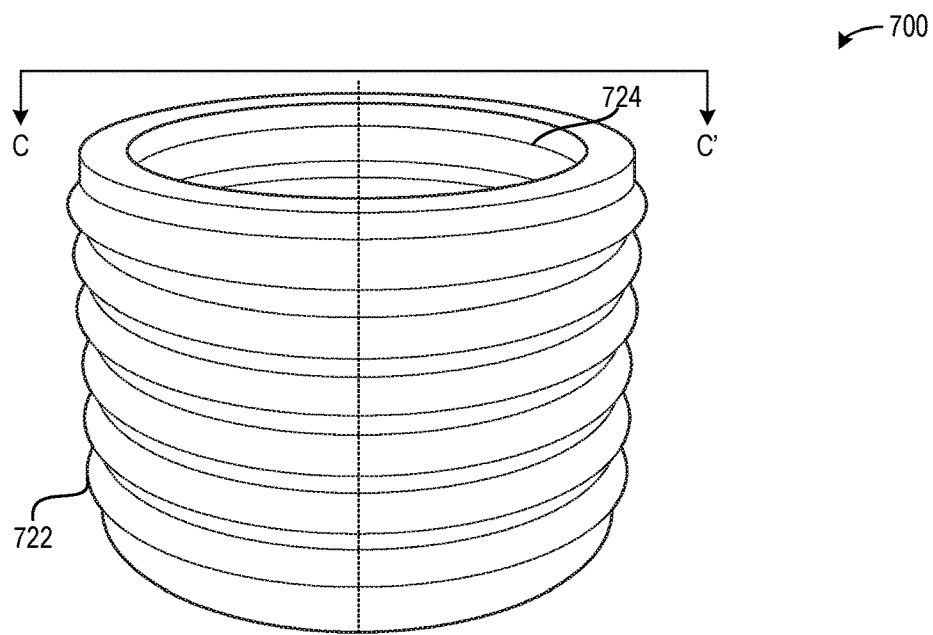
FIG. 7
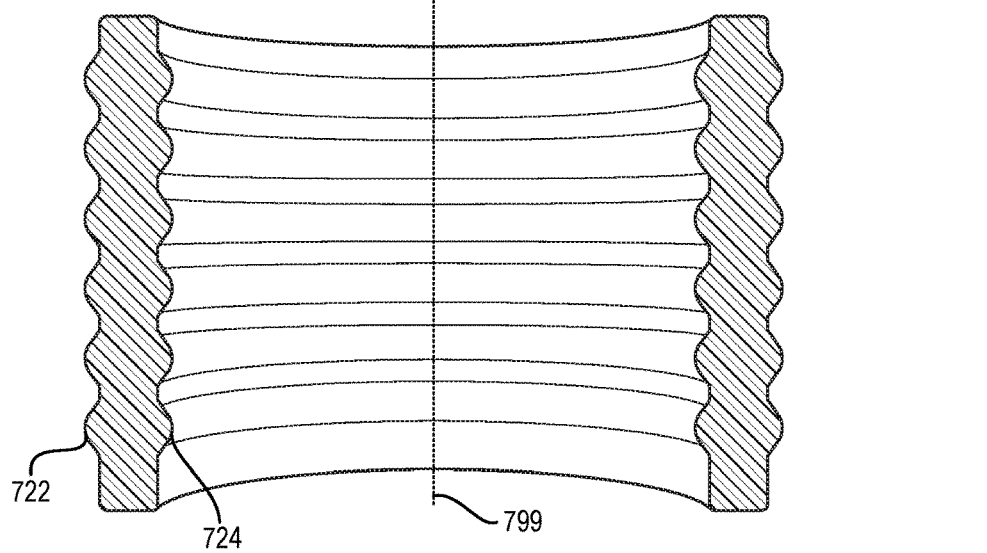
FIG. 8
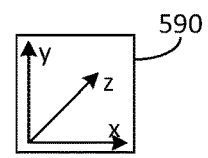

REDUNDANT SEAL WITH RADIAL FEATURES

FIELD

The present description relates generally to a cartridge seal comprising axial and radial sealing for a tube joint.

BACKGROUND/SUMMARY

Systems for transporting and housing fluids may include a plurality of seals including polymeric, deformable components that may be widely used in different applications within the system to create a pressure-tight joint between parts. These seals may include radial seals, axial seals, and/or O-rings.

In some examples, radial seals may be compressed in a radial direction whereas axial seals may be compressed in an axial direction. In some applications, redundant sealing may be used, wherein two of the same seal is used to create a pressure-tight joint. However, such system may have a common noise factor that may degrade the redundant seals.

Other examples of addressing the common noise factor while still producing the pressure-tight joint include different sealing mechanisms. One example approach is shown by Laule et al. in U.S. Pat. No. 7,975,870. Therein, a ring seal engages with a radial flange and an axial flange of a fuel tank. The ring seal comprises a tail and lobes that together are used to improve a sealing performed and block the seal from a pressure burst.

However, the inventors have identified some issues with the approaches described above. For example, a packaging size of the ring seal is large, which increases a size of joints in which it may be arranged. Furthermore, the ring seal deviates from a common plane, which contributes to the increase packaging size and may further contribute to uneven load distribution.

In one example, the issues described above may be addressed by a system comprising a seal comprising a plurality of radial features and a plurality of axial features extending from a cylindrical body, the cylindrical body comprises a first material and a second material, wherein the second material is stiffer than the first material. In this way, a rigidity of the seal may be enhanced while minimizing a profile of the seal.

As one example, the second material may provide a counterforce to forces applied by surfaces interfacing with the plurality of radial and axial features. The counterforce may enable the seal to increase its sealing load, thereby mitigate fluid leaking through the seal. The second material may further mitigate degradation during installation of the seal. As such, the seal of the present disclosure may be utilized in a greater number of applications relative to previous examples of seals due to its reduced packaging size while enhancing a sealing load generated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7 and 8 illustrates an alternative embodiment of the seal.

FIGS. 2-10 are shown to scale, however, other example dimensions may be used if desired.

DETAILED DESCRIPTION

Figure 9:
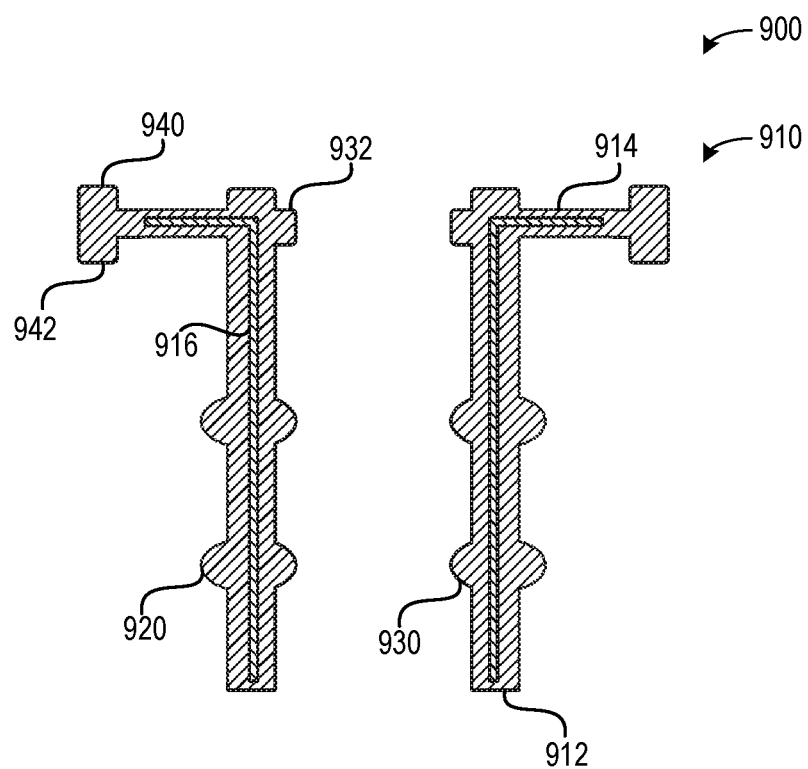
FIG. 9 illustrates a further embodiment of the seal.
Figure 10:
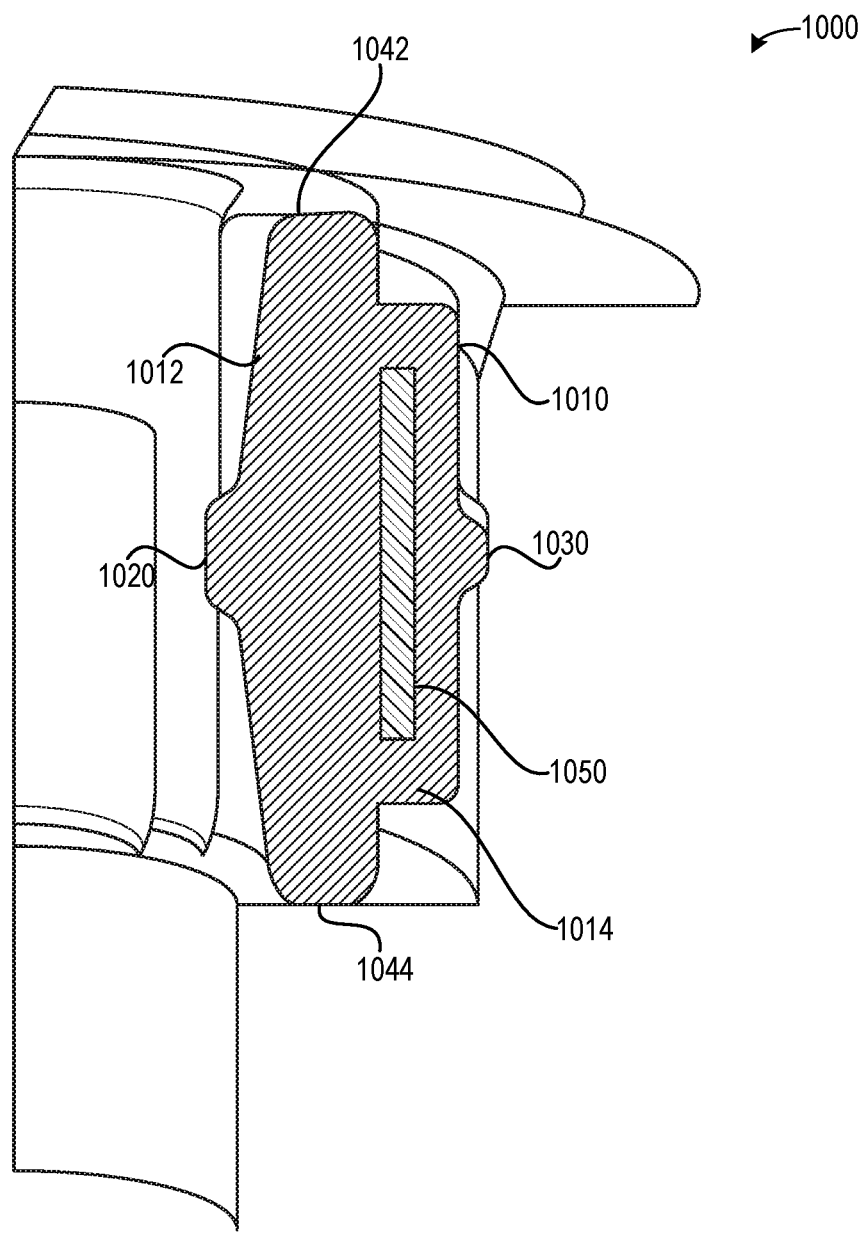
FIG. 10 illustrates an additional embodiment of the seal.

The following description relates to systems and methods for a seal. In one example, the seal is a cartridge seal. The seal may be used in a plurality of systems included in a vehicle, such as the hybrid vehicle illustrated in FIG. 1. FIG. 2 illustrates an example of the seal in a turbocharger system. FIGS. 3-6 illustrates various views of a first example of the seal. FIGS. 7-8 illustrates views of a second example of the seal. FIG. 9 illustrates a view of a third example of the seal. FIG. 10 illustrates a view of a fourth example of the seal.

FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
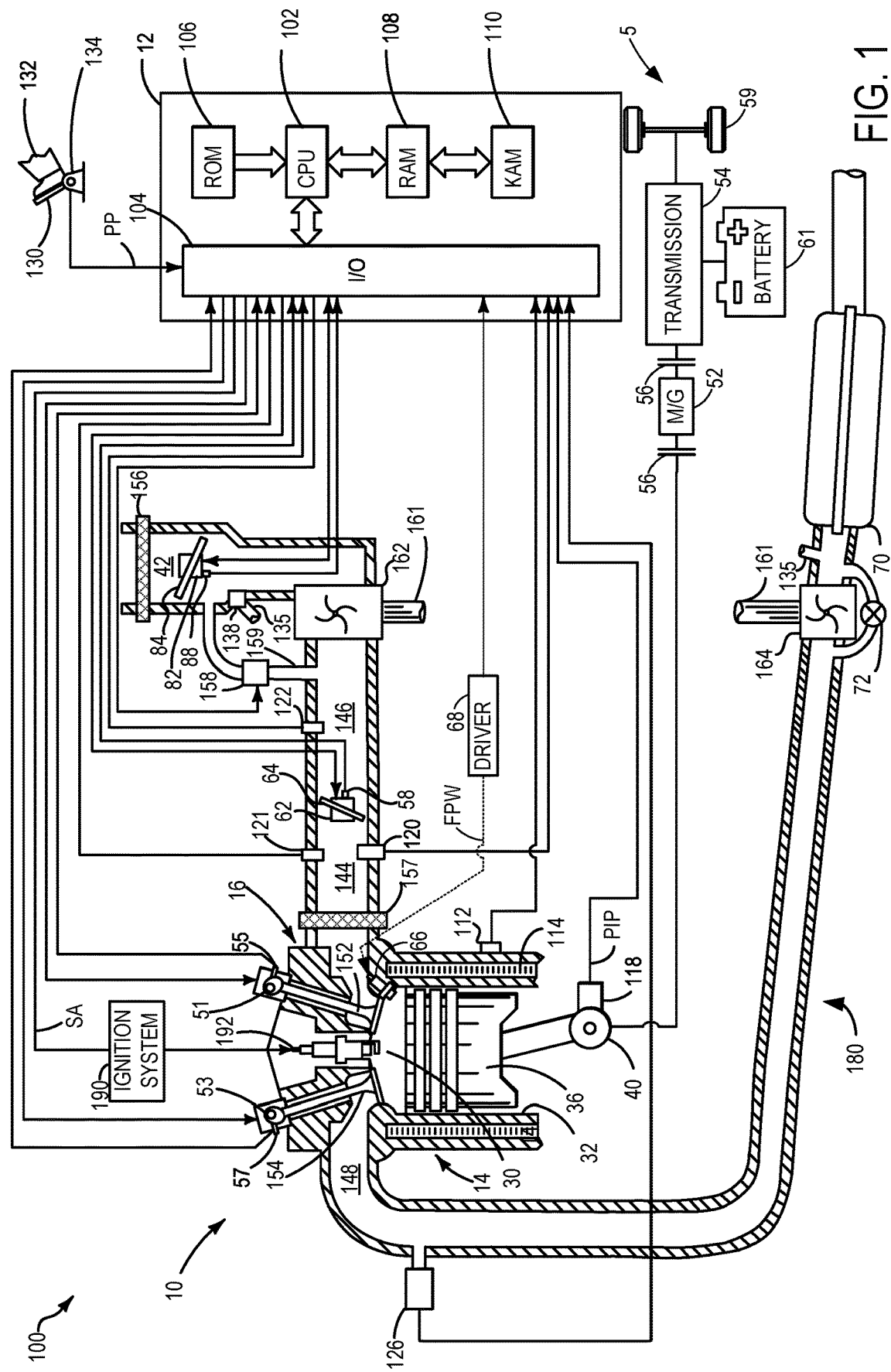
FIG. 1 illustrates a schematic of an engine included in a hybrid vehicle.
Figure 2:
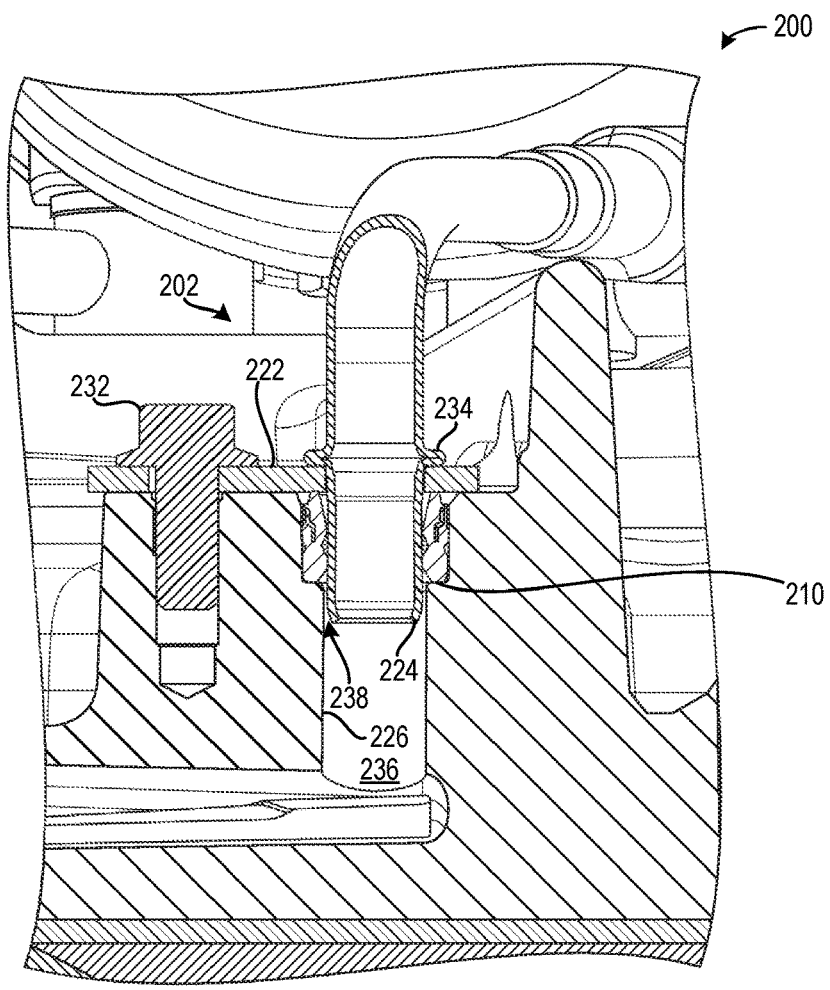
FIG. 2 illustrates a turbocharger system comprising a seal.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes.

However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning now to FIG. 2, an exemplary embodiment of a seal 210 arranged in a turbocharger system 200. In one example, the turbocharger system may be a non-limiting example of a turbocharger which comprises the turbine 164 and the compressor 162 of FIG. 1. The exemplary embodiment 200 of the seal 210 is merely one example embodiment of the seal 210 and one example usage environment of the seal 210.

In the example of FIG. 2, the seal 210 is configured to form a pressure-tight seal at a joint 202. The joint 202 may represent an interface between two coupled tubes or other similar components configured to transfer a fluid, such as a liquid or a gas. As such, while FIG. 2 illustrates an environment of the turbocharger 200, the seal 210 may be used in other joints and/or interfaces without departing from the scope of the present disclosure. For example, the seal 210 may be used in EGR systems, fuel systems, coolant systems, lubricant systems, water systems, and the like. As such, the seal 210 may be arranged in all-electric and/or hybrid applications without departing from the scope of the present disclosure. It will be further appreciated that the seal 210 may be used in fluid transfer systems outside of automotive applications. In one example, the seal 210 is a cartridge seal.

The seal 210 is in engagement with a first surface 222, a second surface 224, and a third surface 226. The first surface 222 may be in face sharing contact with each of the second surface 224 and the third surface 226. The second surface 224 and the third surface 226 may be spaced away from one another such that the surfaces do not touch. In one example, the first surface 222 is physically coupled to the third surface 226 via a fastener 232. In one example, the fastener 232 is a bolt. The second surface 224 may comprise an overlap 234 in face-sharing contact with the first surface 222. The overlap 234 and portions of the second surface 224 may be physically coupled to the first surface 222 via one or more of welds, fusions, adhesives, and the like. It will be appreciated that the seal 210 may be configured to engage with fewer or greater than the three surfaces described herein.

In one example, the second surface 224 corresponds to a surface of a conduit, such as a tube or a pipe. Fluid flow may be contained via the second surface 224, wherein the fluid flow may be exiting or entering the cut-away from the second surface 224 illustrated in the example of FIG. 2. Additionally or alternatively, fluid may contact the third surface 226. In one example, the second surface 224 may correspond to a first passage and the third surface 226 may correspond to a second passage, wherein the first and second passages are fluidly coupled. Fluid flowing from the first passage to the second passage may be pressurized, additionally or alternatively. In some examples, the fluid may be hot or cold, which may result in temperature fluctuations of the second surface 224 and the third surface 226. In one example, the fluid is a lubricant. Additionally or alternatively, the fluid is a coolant.

In one example, the second surface 224 is a pipe and the third surface 226 corresponds to a main body of a turbine of the turbocharger system 202. As such, the first surface 222 may be a turbine housing and/or a turbine outer surface, through which the pipe extends. The pipe may be fluidly coupled to an inner chamber 236 shaped via the third surface 226. In order to block fluid leaking through a gap 238 arranged between the first surface 222, second surface 224, and third surface 226, the seal 210, which is arranged within the gap 238 at an interface between each of the surfaces, may provide a sealing load when in compression with the interfacing surfaces. As such, the seal 210 may block fluid from escaping through the gap 238. Features of the seal 210 are described in greater detail below with respect to FIG. 3.

Figure 3:
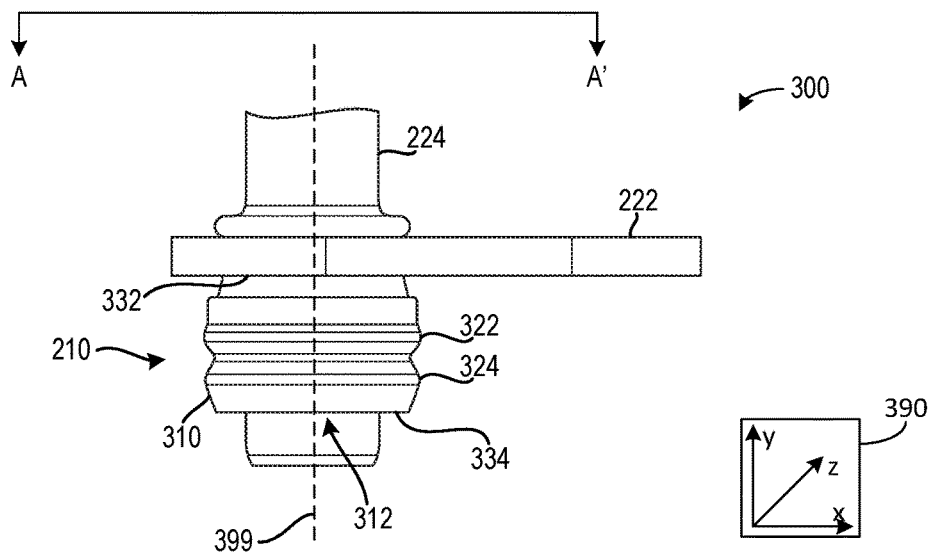
FIG. 3 illustrates a view of the seal outside of the turbocharger system.

Turning now to FIG. 3, it shows an embodiment 300 illustrating a detailed depiction of the seal 210 interfacing with the first surface 222 and the second surface 224. In the example of FIG. 3, the third surface (e.g., third surface 226 of FIG. 2) is omitted to show the seal 210 in an expanded state. That is to say, the seal 210 is illustrated in a less compressed state compared to its depiction in FIG. 2.

The seal 210 comprises a plurality of surface features configured to enhance a sealing load along with mitigation of noise generated by the seal 210. The seal 210 comprises a main body 310. The main body 310 may comprise an opening 312 through which the second surface 224 may be inserted. As such, the main body 310 may comprise a diameter corresponding larger than a diameter of the second surface 224. In one example, interior surfaces of the opening 312 are in face-sharing contact with the second surface 224.

Features of the seal 210 may be described with respect to an axis system 390 comprising three axes, namely an x-axis parallel to a horizontal direction, a y-axis parallel to a vertical direction, and a z-axis perpendicular to each of the x- and y-axes. A central axis 399 of the second surface 224 corresponds to a central axis of the seal 210. As such, the second surface 224 and the seal 210 are concentric about the central axis 399.

The main body 310 comprises a plurality of radial features and a plurality of axial features. The plurality of radial features comprises at least a first exterior radial feature 322 and a second exterior radial feature 324. The first exterior radial feature 322 may be a protrusion or other similar shape that extends in a radially outward direction from the main body 310. Similarly, the second exterior radial feature 324 may be a protrusion or other similar shape that extends in a radially outward direction from the main body 310. In one example, each of the first exterior radial feature 322 and the second exterior radial feature 324 are beads extending around an entire circumference of the main body 310. The first and second exterior radial features 322, 324 may be in face-sharing contact with the third surface, such as third surface 226 of FIG. 2. As such, the first and second exterior radial features 322, 324 may protrude in a radial direction away from the second surface 224.

In the example of FIG. 3, the first and second exterior radial features 322, 324 are curved and may extend away from the main body 310 gradually. By doing this, the first and second exterior radial features 322, 324 may be free of right corners or other similar shapes that may decrease a durability of the seal 210.

The plurality of axial features includes an upper axial feature 332 and a lower axial feature 334. The upper axial feature 332 may be arranged on a first end of the main body 310 and the lower axial feature 334 may be arranged on a second end of the main body 310, wherein the second end is directly opposite the first end. The upper axial feature 332 may comprise a conical shape, wherein sides of the upper axial feature 332 are angled radially inward. As such, a thickness of the main body 310, measured along the x-z plane in the radial directions, at the upper axial feature 332 may be smaller than a thickness of the main body 310 at all other portions of the main body 310. By shaping the upper axial feature 332 in this way, the upper axial feature 332 may be receded relative to the first exterior radial feature 322, thereby mitigating radial contact between the upper axial feature 332 and a surface (e.g., the third surface 226 of FIG. 2). In one example, the upper axial feature 332 is only in face-sharing contact with the first surface 222.

The lower axial feature 334 may also comprise a conical shape wherein side walls of the lower axial feature 334 are angled radially inward. The thickness of the main body 310 at the lower axial feature 334 may be greater than or equal to the thickness of the main body 310 at the upper axial feature 334 while being less than thicknesses of the main body 310 between the two axial features. Similar to the upper axial feature 332, the lower axial feature 334 may receive zero to little radial load from a surface (e.g., the third surface 226 of FIG. 2). However, the lower axial feature 334 may be in face-sharing contact with a portion of the third surface (e.g., third surface 226) such that a compression force applied to the lower axial feature 334 is primarily along an axial axis parallel to the y-axis.

In this way, the first and second exterior radial features may be configured to receive a compression load along only radial directions within the x-z plane and the upper and lower axial features are configured to receive a compression load along only axial directions parallel to the y-axis. Radial compression loads applied to the first and second exterior radial features may be from only the third surface in one example. Axial loads applied to the upper axial feature may be applied via the first surface 222. Axial loads applied to the lower axial feature may be applied via the third surface. In this way, the third surface may be in face-sharing contact with each of the first and second exterior radial features and the lower axial feature while apply force loads in different directions to the different surface features.

Figure 4:
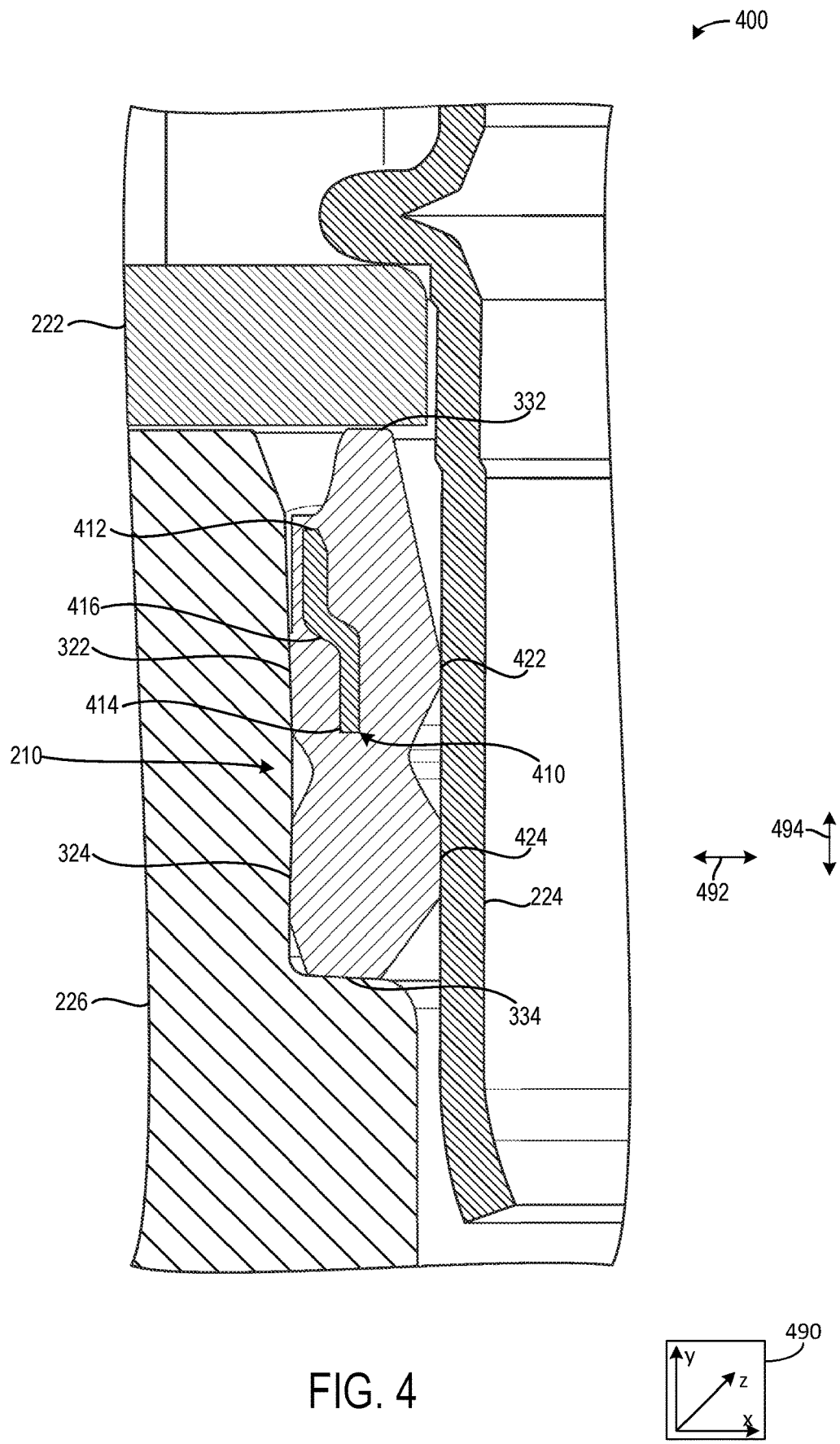
FIG. 4. Illustrates a cross-section of a half of the seal.

Turning now to FIG. 4, it shows a cross-section 400 taken along the cutting plane A-A'. As illustrated, the first exterior radial feature 322 and the second exterior radial feature 324 are in face-sharing contact with the third surface 226. The upper axial feature 332 is in face-sharing contact with the first surface 222 and the lower axial feature 334 is in face-sharing contact with the third surface 226. The third surface 226 compresses the first and second exterior radial features 322, 324 in a radial direction, illustrated via arrow 492 and the lower axial feature 334 in an axial direction, illustrated via arrow 494.

An axis system 490 is shown comprising three-axes, namely an x-axis parallel to a horizontal direction, a y-axis parallel to an axial direction, and a z-axis perpendicular to each of the x- and y-axes. The radial direction may lie within an x-z plane.

In the cross-section, a first interior radial feature 422 and a second interior radial feature 324 are illustrated. The first interior radial feature 422 may be proximal to the first exterior radial feature 322 and the upper axial feature 332. The second interior radial feature 424 may be proximal to the second exterior radial feature 324 and the lower axial feature 334. The first interior radial feature 422 is in face-sharing contact with the second surface 224. The second interior radial features 424 is in face-sharing contact with the second surface 224. The second interior radial feature 424 is in face-sharing contact with a portion of the second surface 224 closer to an outlet 442 of a pipe shaped via the second surface 224 than the first interior radial feature 422.

As illustrated, the seal 210 may be asymmetric about the x, y, and z-axes. In this way, each of the exterior and interior radial features may be shaped differently from one another. Furthermore, the upper and lower axial features may be shaped differently from one another. In some examples, additionally or alternatively, two or more of the radial features and axial features may be similarly shaped.

The seal 210 may comprise a first material which shapes each of the radial and axial features along with a majority of a body of the seal. The first material may be an elastomer, wherein the radial and axial features are molded raised features on upper, lower, inner diameter, and outer diameter surfaces of the seal 210 that provide a sealing load when in compression with interfacing joints, such as the first surface 222, the second surface 224, and the third surface 226. In one example, the seal 210 only comprises the first material. Additionally or alternatively, the first material may be other types of compressible materials other than the elastomer.

A second material 410 may be arranged within the seal 210. In one example, the first material is over-molded on the second material 410. The second material 410 is different than the first material. In one example, the second material 410 is harder (e.g., more stiff and more rigid) than the first material. As such, the second material 410 may provide additional structural support to the seal 210. Herein, the second material 410 is interchangeably referred to as a spine feature 410. Said another way, the spine feature 410 is embedded into the first material of the seal such that the spine feature 410 is completely covered by the first material. In this way, the radial and axial features are only in contact with the first material and do not contact the spine feature 410.

The spine feature 410 is an over-molded ring comprising a material stiffer than the elastomer (e.g., the first material) of the seal 210. The spine feature 410 provides increased rigidity during installation to mitigate seal degradation. The spine feature 410 is further configured to allow pressure activation to a portion of the radial and axial features. Additionally or alternatively, the spine feature 410 provides a surface for the elastomer to react against (e.g., press against), both axially and radially, while increasing a sealing load and decreasing a size of the seal relative to previous examples. The spine feature 410 further allows lower ergonomic installation forces.

The spine feature 410 comprises a first extreme end 412 and a second extreme end 414 opposite the first extreme end 412. The first extreme end 412 and the second extreme end 414 are axially and radially misaligned due to a bend 416 arranged between the first and second extreme ends 412, 414. In one example, the bend 416 is arranged directly between the first and second extreme ends 412, 414. Alternatively, the bend 416 may be biased toward one of the first extreme end 412 and the second extreme end 414.

In one example, the spine feature 410 comprises a Z-shape. However, it will be appreciated that the spine feature 410 may comprise other shapes, such as an S-shape, without departing from the scope of the present disclosure. In the example of FIG. 4, the spine feature 410 is proximal to the upper axial feature 332, the first exterior radial feature 322, and the first interior radial feature 422. The spine feature 410 may comprise uniform thickness, measured in the radial direction, from the first end 412 to the second end 414. However, it will be appreciated that in some embodiments, the spine feature 410 may comprise a varying thickness.

Figure 5:
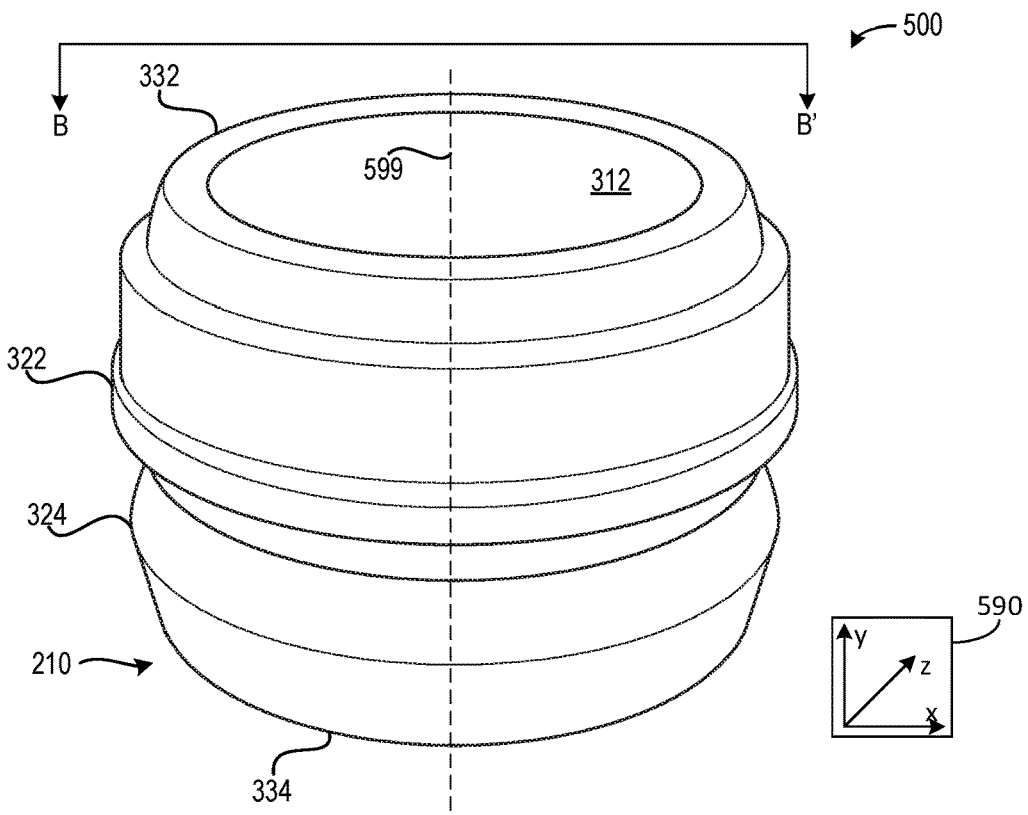
FIG. 5 illustrates a view of the entire seal.

Turning now to FIG. 5, it shows an embodiment 500 of only the seal 210. As such, in the embodiment 500, the seal 210 may not be compressed by one or more surfaces. The seal 210 comprises a central axis 599, which extends through a center of the opening 312 of the seal 210. The seal 210 comprises a substantially cylindrical shape with the radial and axial features protruding radially outward or radially inward relative to the cylindrical shape of the seal 210. As illustrated, the first exterior radial feature 322 and the second exterior radial feature 324 protrude radially outward and the upper axial feature 332 and the lower axial feature 334 protrude in axial opposite directions along a height of the cylinder shape.

Figure 6:
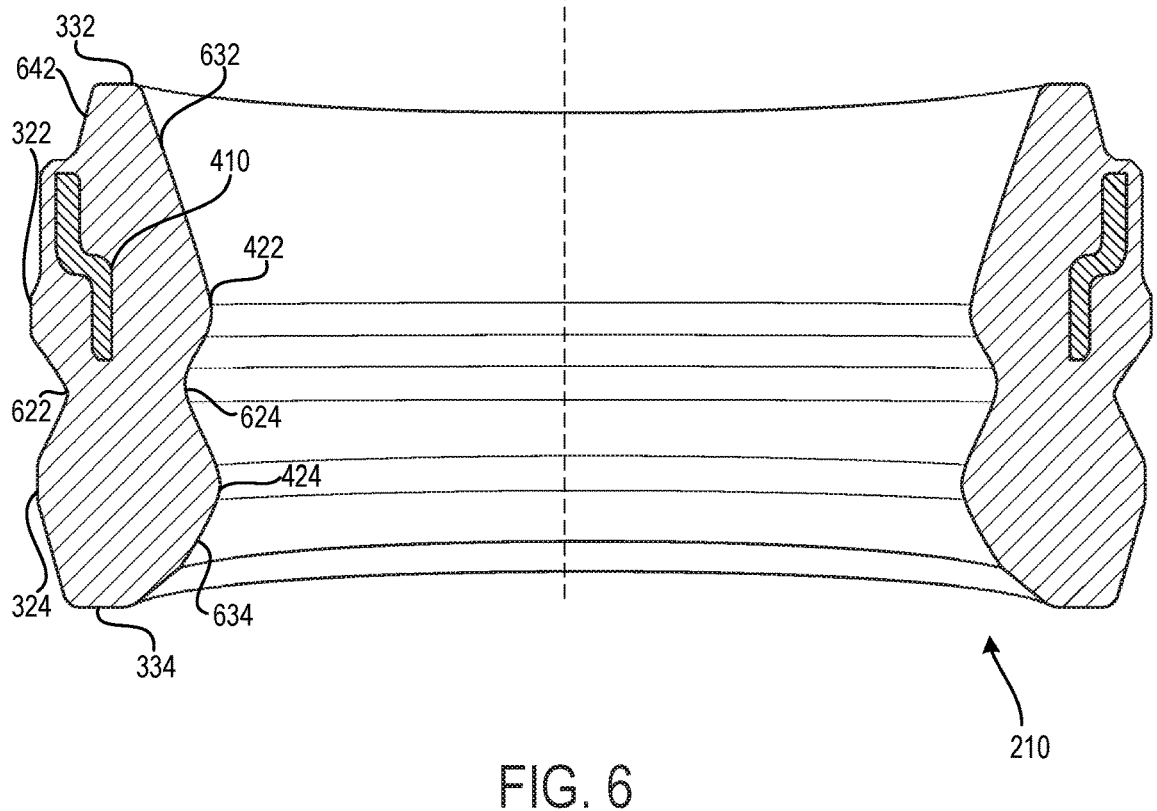
FIG. 6 illustrates of cross-sectional view of the embodiment of FIG. 5.

Turning now to FIG. 6, it shows a cross-section 600 of the embodiment 500 taken along cutting plane B-B' of FIG. 5. The cross-section 600 reveals the spine feature 410 and the first interior radial feature 422 and the second interior radial feature 424. The first interior radial feature 422 and the second interior radial feature 424 extend in radially inward directions. An outer indentation 622 is arranged between the first exterior radial feature 322 and the second exterior radial feature 324. An inner indentation 624 is arranged between the first interior radial feature 422 and the second interior radial feature 424. The outer and inner indentations 622, 624 may be spaces between materials (e.g., beads) of the interior and exterior radial features.

In some examples, the shape of the interior radial features may be more pointed than the shape of the exterior radial features. For example, the first and second interior radial features 422, 424 may comprise a pointed shape whereas the first and second exterior radial features 322, 324 may comprise a blunt shape. In one example, the first and second exterior radial features 322, 324 are flat and are not pointed.

An upper slope 632 extending from the upper axial feature 332 to the first interior radial feature 422 may comprise a gradual slope shape whereas a lower slope 634 extending from the second interior radial feature 424 to the lower axial feature 334 may comprise a curved, high-magnitude slope shape. That is to say, an angle of the lower slope 634 may be greater than an angle of the upper slope 632.

The seal 210 further comprises a step feature 642 arranged between the upper axial feature 332 and the first exterior radial seal 322. In one example, the step feature 642 corresponds to a space between an outer circumference at a top of the seal 210 and the upper axial feature 332. In one example, the seal 210 is injection molded over the spine feature 410. The spine feature 410 may comprise a material harder and/or stiffer than a material of the seal 210. In one example, the spine feature 410 is metal and the material of the seal 210 molded over the spine feature 410 is elastomer or other compressible material.

In some examples of the seal 210, the spine feature 410 may be linear. Furthermore, the spine feature 410 may be arranged closer to the interior radial features or to the exterior radial features, additionally or alternatively. In alternative examples, a spacing between the exterior radial features may be increased or decreased. Additionally or alternatively, a spacing between the interior radial features may be increased or decreased. In one example, the spacing between the exterior radial features is increased and the spacing between the interior radial features is decreased such that a distance between the exterior radial features is greater than a distance between the interior radial features. Said another way, a space between adjacent interior radial features may be less than a space between adjacent exterior radial features.

Turning now to FIGS. 7 and 8, they show an alternative embodiment 700 and a cross-section 800 of the alternative embodiment taken along a cutting plan C-C'. The alternative embodiment 700 may be used similarly to the embodiment illustrated in FIGS. 2-6. The alternative embodiment 700 may differ in that it comprises a greater number of radially exterior and interior features. For example, the alternative embodiment comprises a plurality of radially exterior features 722 and a plurality of radially interior features 724.

In one example, the plurality of radially exterior feature 722 and the plurality of radially interior features 724 are substantially identical to one another in shape and size. Furthermore, the exterior and interior radial features may be arranged along a similar height of a central axis 799.

In one example, a spine feature is omitted from the alternative embodiment 700. In some examples, the elastomeric material of the alternative embodiment 700 may be bolstered via the increased number of radial features such that a spine feature is not desired. That is to say, Turning now to FIG. 9, it illustrates a further embodiment 900 of a seal 910. The seal 910 may be used similarly to the seal 210 of FIGS. 2-6. The seal 910 may differ from the seal 210 in that it comprises an L-shaped cross-section. However, the seal 910 is a single piece, as is the seal 210. A first body 912 of the seal 910 comprises radially exterior features 920 and radially interior features 930. A second body 914 of the seal 910 comprises upper axial features 940 and a lower axial feature 942. The second body 914 further comprises an upper interior radial feature 932. The second body 914 may extend perpendicularly from the first body 912. A spine feature 916 may extend through each of the first body 912 and the second body 914 such that it shares the angular bend of the seal 910.

The radially exterior features 920 and the radially interior features 930 may comprise a similar size and shape. In one example, the radially interior and exterior features 920, 930 may comprise a half-circle shape. A shape of the upper interior radial feature 932 may be different than the shape of the radially interior and exterior features 920, 930. In one example, the upper interior radial feature 932 may comprise a square shape. The further embodiment 900 may be a single piece, similar to the seal 210.

In the example of FIG. 9, the seal 910 is illustrated as a cross-section of its whole. As such, the seal 910 may comprise a cylindrical body, which corresponds to the first body 912, coupled to a ring-shaped top piece, corresponding to the second body 914.

Turning now to FIG. 10, it shows an additional embodiment 1000 of a seal 1010, which may be used similarly to the seal 210 of FIGS. 2-6. The seal 910 comprises an interior radial feature 1020 and an exterior radial feature 1030. The seal 910 further comprises axial features including an upper axial feature 1042 and a lower axial feature 1044. In one example, the interior radial feature 1020 is directly opposite the exterior radial feature 1030. Furthermore, the interior radial feature 1020 may be similarly shaped to the exterior radial feature 1030. However, a size of the interior radial feature 1020 may be greater than a size of the exterior radial feature 1030.

The upper axial feature 1042 and the lower axial feature 1044 may be similar in size and shape. The seal 1010 may comprise two portions, a first portion 1012 and a second portion 1014 continuous with one another. The first portion 1012 and the second portion 1014 may combine to form a mushroom-shape, wherein the first portion 1012 extends outwardly beyond a boundary of the second portion 1014. That is to say, a length of the first portion 1012 along the y-axis is greater than a length of the second portion 1014 along the y-axis.

A spine feature 1050 may be arranged at an interface between the first portion 1012 and the second portion 1014. The spine feature 1050 may be linear and arranged directly between the interior radial feature 1020 and the exterior radial feature 1030. Similar to the previous embodiments, the spine feature 1050 may comprise a material stiffer than a material of the first portion 1012 and the second portion 1014.

In this way, a sealing device may comprise redundant radial and axial seals while maintaining a compact size. The sealing device may optionally comprise a spine feature, which may improve a durability and a sealing effect. A technical effect of including the spine feature is to decrease a packaging size of the seal while increasing a compression seal formed by the sealing device when inserted between two or more components.

An example of a system, comprises a seal comprising a plurality of radial features and a plurality of axial features extending from a cylindrical body, the cylindrical body comprises a first material and a second material, wherein the second material is stiffer than the first material.

A first example of the system comprises where the first material is an elastomer and wherein the second material is a metal.

A second example of the system, optionally including the first example, further comprises where the plurality of radial features extends from only the first material.

A third example of the system, optionally including one or more of the previous examples, further includes where the plurality of axial features extends from only the first material.

A fourth example of the system, optionally including one or more of the previous examples, further includes where the first material surrounds the second material.

A fifth example of the system, optionally including one or more of the previous examples, further includes where the plurality of radial features includes exterior radial features extending in a radially outward direction and interior radial features extending in a radially inward direction.

A sixth example of the system, optionally including one or more of the previous examples, further includes where the plurality of axial features includes at least one axial feature arranged on a first side of the seal and at least one axial features arranged on a second side of the seal, wherein the first side is opposite the second side.

An example of the sealing device comprises a spine feature comprising a stiff material encased in an elastomeric material, wherein a plurality of exterior radial features extends radially outward from the elastomeric material and a plurality of interior radial features extends radially inward from the elastomeric material, and wherein an upper axial feature extends from a first end of the elastomeric material and wherein a lower axial feature extends from a second end of the elastomeric material, wherein the first end is opposite the second end.

A first example of the sealing device further comprises where the plurality of exterior radial features comprises a blunt end and wherein the plurality of interior radial features comprises a pointed end.

A second example of the sealing device, optionally including the first example, further includes where the plurality of exterior radial features and the plurality of interior radial features are identical in shape.

A third example of the sealing device, optionally including one or more of the previous examples, further includes where a space between adjacent exterior radial features of the plurality of exterior radial features is greater than a space between interior radial features of the plurality of interior radial features.

A fourth example of the sealing device, optionally including one or more of the previous examples, further includes where the spine feature comprises a bend.

A fifth example of the sealing device, optionally including one or more of the previous examples, further includes where the spine feature is located closer to the upper axial feature than the lower axial feature.

A sixth example of the sealing device, optionally including one or more of the previous examples, further includes where the bend is normal.

A seventh example of the sealing device, optionally including one or more of the previous examples, further includes where the spine feature is linear.

An eighth example of the sealing device, optionally including one or more of the previous examples, further includes where each radially interior feature of the plurality of radially interior features is shaped similarly.

An embodiment of a system, comprises a cartridge seal comprising at least one upper axial feature configured to engage with a first surface, a plurality of exterior radial features and at least one lower axial feature configured to engage with a second surface, and a plurality of interior radial features configured to engage with a third surface and a spine feature embedded in a compressible material of the cartridge seal, the spine feature configured to provide a counterforce relative to a force of the first surface, the second surface, and the third surface.

A first example of the system optionally includes where the spine feature is metal and comprises a Z-shape.

A second example of the system, optionally including the first example, further includes where the cartridge seal is asymmetric or symmetric.

A third example of the system, optionally including one or more of the previous examples, further includes where spine feature is biased toward one of the upper axial feature, the plurality of exterior radial features, the plurality of interior radial features, or the lower axial feature.

In another representation, the engine is an engine of a hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a seal comprising a plurality of radial features and a plurality of axial features extending from a cylindrical body, wherein a plurality of interior radial features extend into a central bore of the seal and a plurality of exterior radial features extend away from the central bore of the seal, the cylindrical body comprises a first material and a second material embedded within the first material, wherein the second material has a Z-shape and is stiffer than the first material, and a step feature arranged between the second material, an upper radial feature of the plurality of radial features, and an upper axial feature of the plurality of axial features, wherein the upper radial and axial features are respectively uppermost radial and axial projections of the seal, wherein the step feature is adjacent to a first extreme end of the second material axially higher than the upper radial feature and axially lower than the upper axial feature, and wherein the second material comprises a second extreme end, opposite the first extreme end and axially between the plurality of radial features.

2. The system of claim 1, wherein the first material is an elastomer and wherein the second material is a metal.

3. The system of claim 2, wherein the plurality of radial features extends from only the first material.

4. The system of claim 2, wherein the plurality of axial features extends from only the first material.

5. The system of claim 2, wherein the first material completely surrounds the second material.

6. The system of claim 1, wherein the plurality of radial features includes exterior radial features extending in a radially outward direction and interior radial features extending in a radially inward direction into the central bore of the seal, and wherein the second material is closer to the exterior radial features compared to the interior radial features.

7. The system of claim 1, wherein the plurality of axial features includes at least one axial feature arranged on a first side of the seal and at least one axial feature arranged on a second side of the seal, wherein the first side is opposite the second side.

8. A sealing device, comprising:
a spine feature having a Z-shape, the spine feature comprising a stiff material encased in an elastomeric material, wherein a plurality of exterior radial features extends radially outward from the elastomeric material and a plurality of interior radial features extends radially inward from the elastomeric material toward a bore of the sealing device, and wherein an upper axial feature extends from a first end of the elastomeric material and wherein a lower axial feature extends from a second end of the elastomeric material, wherein the first end is opposite the second end, and a step feature arranged between the spine feature, an upper exterior radial feature of the plurality of exterior radial features, and the upper axial feature, wherein a first extreme end of the spine feature is adjacent to the step feature and axially between the upper exterior radial feature and the upper axial feature, wherein the upper exterior radial feature and the upper axial feature are respectively uppermost radial and axial projections of the sealing device, and a second extreme end of the spine feature, opposite the first extreme end, axially between the plurality of exterior radial features and the plurality of interior radial features.

9. The sealing device of claim 8, wherein the plurality of exterior radial features comprises a blunt end and wherein the plurality of interior radial features comprises a pointed end.

10. The sealing device of claim 8, wherein the plurality of exterior radial features and the plurality of interior radial features are different in shape.

11. The sealing device of claim 8, wherein an outer indentation is between adjacent exterior radial features of the plurality of exterior radial features and an inner indentation is between interior radial features of the plurality of interior radial features.

12. The sealing device of claim 8, wherein the spine feature comprises a bend.

13. The sealing device of claim 12, wherein the spine feature is located closer to the upper axial feature than the lower axial feature.

14. The sealing device of claim 12, wherein the bend is normal.

15. The sealing device of claim 8, wherein the material of the sealing device is molded over the spine feature.

16. The sealing device of claim 8, wherein each interior radially feature of the plurality of interior radial features is shaped similarly.

17. A system, comprising:
a seal comprising at least one upper axial feature configured to engage with a first surface, a plurality of exterior radial features and at least one lower axial feature configured to engage with a second surface outside a central bore of the seal, and a plurality of interior radial features configured to engage with a third surface inside the central bore of the seal;
a spine feature comprising a Z-shape, embedded in a compressible material of the seal, the spine feature configured to provide a counterforce relative to a force of the first surface, the second surface, and the third surface; and
a step feature arranged adjacent to a first extreme end of the spine feature and axially between an upper radial feature of the plurality of exterior radial features and the at least one upper axial feature, wherein the spine feature further comprises a second extreme end, axially below the first extreme end, and between the plurality of exterior radial features and the at least one upper axial feature.

18. The system of claim 17, wherein the spine feature is metal.

19. The system of claim 17, wherein the seal is asymmetric or symmetric.

20. The system of claim 17, wherein the spine feature is biased toward one of the at least one upper axial feature, the plurality of exterior radial features, the plurality of interior radial features, or the at least one lower axial feature.

* * * * *